UNITED STATES PATENT OFFICE.

HENRY E. MERRILL, OF AKRON, OHIO, ASSIGNOR TO THE E. H. MERRILL COMPANY, OF SAME PLACE.

COMPOUND FOR MAKING POROUS BODIES.

SPECIFICATION forming part of Letters Patent No. 613,907, dated November 8, 1898.

Application filed December 3, 1896. Serial No. 614,323. (No specimens.)

*To all whom it may concern:*

Be it known that I, HENRY E. MERRILL, a citizen of the United States, residing at Akron, in the county of Summit and State of Ohio, have invented a certain new and useful Process or Compound for Making Porous Bodies; and I do hereby declare that the following is a full, clear, and exact description of the invention, which will enable others skilled in the art to which it appertains to make and use the same.

My invention relates to what I prefer to term a "filtering compound," and from which are manufactured comparatively cheap but highly efficient filtering-tubes; but it should be understood that although the said compound is now most largely used for making filtering-tubes it is also valuable for making porous cups or tubes for electric batteries and for other purposes where porosity combined with firmness and more or less density of material is wanted.

I am of course aware that various combinations of materials have been and are now being employed to produce what are claimed to be germ-proof water-filtering tubes, and I do not, therefore, claim to be first or original in the production of tubes for this purpose or possessing the germ-proof character; but yet I am not aware that any one has ever before conceived the composition of materials or compound or combination which constitutes my invention and which when treated as hereinafter described produces a tube which is substantially similar or equivalent thereto as an article of manufacture.

To these several ends the composition or compound constituting my invention consists, primarily and broadly, of what is known to the trade as "whiting" or "paris-white" or "English cliff-stone," and of common stoneware clay or their equivalents. These elements or ingredients are used in largely-varying proportions, according to the degree or measure of porosity desired, and hence the whiting may vary from as low as ten per cent. to as high as sixty per cent. of the whole quantity. The larger the quantity of whiting the greater the porosity, and hence the proportions are apt to vary considerably in the manufacture of tubes and are dependent on the uses to which the tubes are to be applied, as well as on other conditions, such as pressure where the tube is used and the like. Then again the thickness or weight of the tube necessarily enters into the consideration of proportions, as a heavy tube need not be as dense as one of less thickness.

In the admixture of the materials only ordinary skill and methods need be employed, and the tubes are shaped up by jollying, molding, or otherwise, as may be found convenient or desirable. When the tube has thus been formed from the raw materials and without any previous treatment or preparation—such as baking or roasting or other treatment which would change its natural character—the tube is placed in a kiln or a portion of a kiln in which what is known as "soft ware" is or could be burned and exposed to only a soft degree of heat—say in the neighborhood of 1,200° Fahrenheit or in some extreme cases as high as 1,500° Fahrenheit. If excessive heat were used—such, for example, as 2,000° Fahrenheit—the tubes would quickly become vitreous and be rendered utterly worthless. Hence care must be exercised to employ only low heats and careful processes. This being done and the tube baked to completion, it is ready for use.

In the foregoing composition and tube I have two elements or parts of distinctly different character, one of which, the clay, may be termed a "plastic" material, and the other, the paris-white, a "non-plastic" or only slightly plastic material, and a possible theory upon which the porosity of the tube when finished is accounted for is the peculiar action or effect of the heat upon the so-called "non-plastic" element and from which certain gases are believed to be volatilized and which leave the tube in a porous state. Hence the fact that the more of the paris-white the tube contains the more porous it becomes, because it is upon this material that the tube relies for its filtering quality; but whatever the true theory of chemical action taking place in the tube may be, it is known that a porous tube is produced which is germ or microbe proof in a filter, and hence its value.

What I claim as new, and desire to secure by Letters Patent, is—

A porous filtering-body formed of common stoneware-clay and whiting in the proportions of from ten to sixty parts of each substance according to the porosity or density of tube desired, and burned or baked, substantially as set forth.

Witness my hand to the foregoing specification this 30th day of November, 1896.

HENRY E. MERRILL.

Witnesses:
H. T. FISHER,
R. B. MOSER.